(12) United States Patent
Bai et al.

(10) Patent No.: US 10,890,779 B2
(45) Date of Patent: Jan. 12, 2021

(54) LASER PROJECTION MODULE, DEPTH CAMERA AND ELECTRONIC DEVICE

(71) Applicant: GUANGDONG OPPO MOBILE TELECOMMUNICATIONS CORP., LTD., Guangdong (CN)

(72) Inventors: Jian Bai, Guangdong (CN); Cheng Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/283,240

(22) Filed: Feb. 22, 2019

(65) Prior Publication Data

US 2019/0265497 A1    Aug. 29, 2019

(30) Foreign Application Priority Data

Feb. 27, 2018  (CN) .......................... 2018 1 0164305
Mar. 12, 2018  (CN) .......................... 2018 1 0201629

(51) Int. Cl.
    *H04N 5/225*    (2006.01)
    *G02B 27/42*    (2006.01)
    (Continued)

(52) U.S. Cl.
    CPC ......... *G02B 27/4205* (2013.01); *G03B 17/54* (2013.01); *G03B 21/206* (2013.01);
    (Continued)

(58) Field of Classification Search
    CPC .. G02B 27/4205; G03B 17/54; G03B 21/208; G03B 21/206; G03B 21/2033; G03B 15/02; H04N 5/2254
    See application file for complete search history.

(56) References Cited

U.S. PATENT DOCUMENTS

2007/0242358 A1   10/2007   Lin et al.
2011/0304831 A1   12/2011   Yoshigai
(Continued)

FOREIGN PATENT DOCUMENTS

CN    101410776    4/2009
CN    101501442    8/2009
(Continued)

OTHER PUBLICATIONS

EPO, Office Action for EP Application No. 19159663, dated Apr. 16, 2019.

(Continued)

*Primary Examiner* — Padma Haliyur
(74) *Attorney, Agent, or Firm* — Hodgson Russ LLP

(57) ABSTRACT

A laser projection module, a depth camera and an electronic device are provided. The laser projection module includes a laser emitter, a collimation element, a diffraction element and a detection component. The laser emitter is configured to emit laser. The collimation element is configured to collimate the laser. The diffraction element is configured to diffract the laser collimated by the collimation element to define a laser pattern. The detection component is disposed to at least one of the collimation element and the diffraction element, and configured to output an electrical signal. The processor is coupled to the detection component, and configured to receive the electrical signal and detect whether the at least one of the collimation element and the diffraction element are abnormal according to the electrical signal.

17 Claims, 11 Drawing Sheets

(51) Int. Cl.
  *G02B 21/20* (2006.01)
  *G03B 21/20* (2006.01)
  *G03B 17/54* (2006.01)
  *G03B 15/02* (2006.01)
(52) U.S. Cl.
  CPC ....... *G03B 21/208* (2013.01); *G03B 21/2033* (2013.01); *H04N 5/2254* (2013.01); *G03B 15/02* (2013.01)

(56) References Cited

U.S. PATENT DOCUMENTS

| | | | |
|---|---|---|---|
| 2012/0281086 | A1 | 11/2012 | Kimura |
| 2012/0281186 | A1 | 11/2012 | Hsiung |
| 2016/0004920 | A1* | 1/2016 | Armstrong-Crews ........................ G03B 35/00 348/46 |
| 2017/0194768 | A1 | 7/2017 | Powers et al. |
| 2018/0084241 | A1* | 3/2018 | Chen .................. G02B 26/0875 |

FOREIGN PATENT DOCUMENTS

| | | |
|---|---|---|
| CN | 102062952 | 5/2011 |
| CN | 107102506 | 8/2017 |
| CN | 107210583 | 9/2017 |
| CN | 107515503 | 12/2017 |
| CN | 107608167 | 1/2018 |
| CN | 107942612 | 4/2018 |
| CN | 108388072 | 8/2018 |
| CN | 108490630 | 9/2018 |
| CN | 108508687 | 9/2018 |
| EP | 2916163 | 9/2015 |
| WO | 2017149092 | 9/2017 |

OTHER PUBLICATIONS

SIPO, First Office Action for CN Application No. 201810201629, dated Apr. 4, 2019.
SIPO, First Office Action for CN Application No. 201810164305, dated Mar. 29, 2019.
WIPO, English Translation of the ISR and WO for PCT/CN2019/072561, dated Apr. 9, 2019.
SIPO, Office Action for CN Application No. 201810201629.0, dated Sep. 12, 2019.
IPI, Office Action for IN Application No. 201914007488, dated Sep. 14, 2020.

* cited by examiner

LASER PROJECTION MODULE, DEPTH CAMERA AND ELECTRONIC DEVICE

CROSS REFERENCE TO RELATED APPLICATION

The present application claims the benefit of prior Chinese Application No. 201810164305.4, filed with the China National Intellectual Property Administration on Feb. 27, 2018, and prior Chinese Application No. 201810201629.0, filed with the China National Intellectual Property Administration on Mar. 12, 2018. The entire disclosures of the aforementioned applications are incorporated herein by reference.

FIELD

The present disclosure relates to a field of optical and electronic technologies, particularly to a laser projection module, a depth camera and an electronic device.

BACKGROUND

Most existing mobile phones are equipped with a laser projection module. The laser projection module includes a laser emitter, a collimation element, and a diffraction element. The diffraction element is arranged above the collimation element. When the mobile phone accidentally falls, the collimation element and the diffraction element may fall off and/or be broken.

SUMMARY

Embodiments of the present disclosure provide a laser projection module, a depth camera and an electronic device.

The laser projection module according to embodiments of the present disclosure includes a laser emitter, a collimation element, a diffraction element, a detection component and a processor. The laser emitter is configured to emit laser. The collimation element is configured to collimate the laser. The diffraction element is configured to diffract the laser collimated by the collimation element to define a laser pattern. The detection component is disposed to at least one of the collimation element and the diffraction element, and configured to output an electrical signal. The processor is connected to the detection component, and configured to receive the electrical signal and detect whether the at least one of the collimation element and the diffraction element is abnormal according to the electrical signal.

The depth camera according to embodiments of the present disclosure includes a laser projection module and an image acquirer. The image acquirer is configured to acquire a laser pattern projected by the laser projection module into a target space. The laser projection module includes a laser emitter, a collimation element, a diffraction element, a detection component and a processor. The laser emitter is configured to emit laser. The collimation element is configured to collimate the laser. The diffraction element is configured to diffract the laser collimated by the collimation element to define a laser pattern. The detection component is disposed to at least one of the collimation element and the diffraction element, and configured to output an electrical signal. The processor is connected to the detection component, and configured to receive the electrical signal and detect whether the at least one of the collimation element and the diffraction element is abnormal according to the electrical signal. The processor is further configured to process the laser pattern to obtain a depth image.

The electronic device according to embodiments of the present disclosure includes a housing and a depth camera. The depth camera is arranged in the housing and exposed out of the housing to acquire a depth image. The depth camera includes a laser emitter, a collimation element, a diffraction element, an image acquirer, a detection component and a processor. The laser emitter is configured to emit laser. The collimation element is configured to collimate the laser. The diffraction element is configured to diffract the laser collimated by the collimation element to define a laser pattern. The detection component is disposed to at least one of the collimation element and the diffraction element, and configured to output an electrical signal. The processor is connected to the detection component, and configured to receive the electrical signal and detect whether the at least one of the collimation element and the diffraction element is abnormal according to the electrical signal. The processor is further configured to process the laser pattern to obtain a depth image.

Additional aspects and advantages of the present disclosure will be given in the following description, some of which will become apparent from the following description or be learned from practices of the present disclosure.

BRIEF DESCRIPTION OF THE DRAWINGS

The above and/or additional aspects and advantages of the present disclosure will become apparent and easy to understand from descriptions of the embodiments with reference to the drawings.

DETAILED DESCRIPTION

Figure 1:
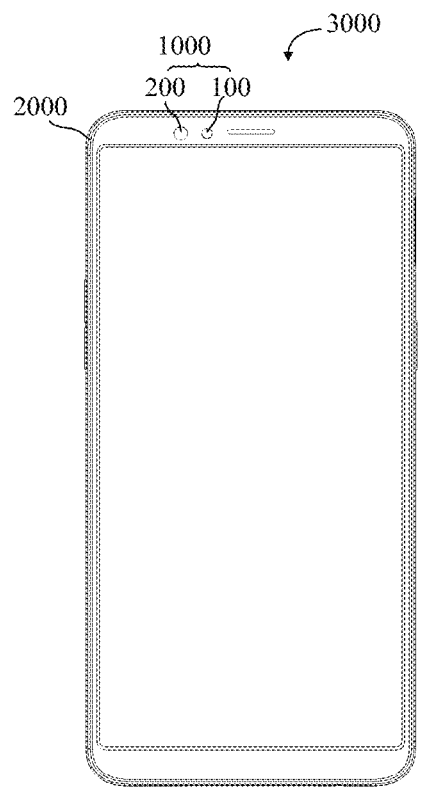
FIG. 1 is a schematic view illustrating an electronic device according to some embodiments of the present disclosure.

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the present invention, it should be noted that, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals and/or letters may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

As illustrated in FIG. 1, an electronic device 3000 according to embodiments of the present disclosure includes a housing 2000 and a depth camera 1000. The electronic device 3000 may be a mobile phone, a tablet computer, a laptop computer, a game machine, a head-mounted display device, an access control system, a teller machine or the like. The embodiment of the present disclosure is illustrated by taking an example that the electronic device 3000 is used as the mobile phone. It can be understood that the electronic device 3000 may have other specific forms, which is not limited herein. The depth camera 1000 is arranged in the housing 2000 and exposed out of the housing 2000 to acquire a depth image. The housing 2000 can provide the depth camera 1000 with protection against dust, water, drop, etc., and the housing 2000 is provided with a hole corresponding to the depth camera 1000 to allow light to pass through the hole out of or into the housing 2000.

Figure 2:
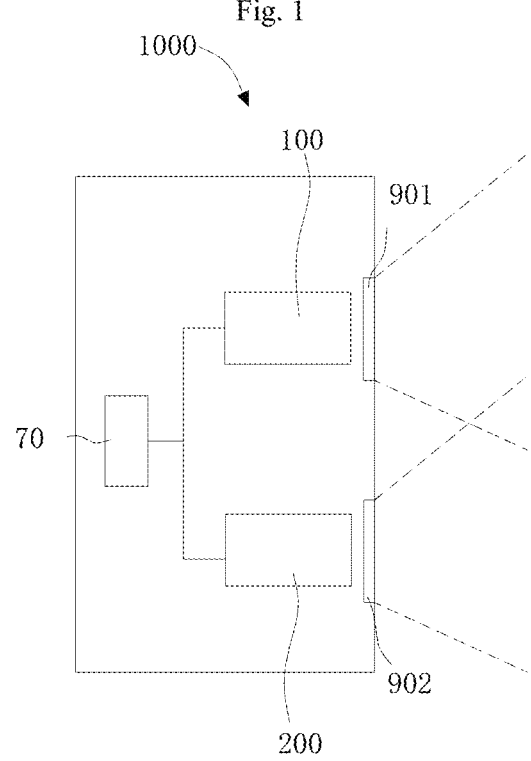
FIG. 2 is a schematic view illustrating a depth camera according to some embodiments of the present disclosure.

As illustrated in FIG. 2, the depth camera 1000 includes a laser projection module 100, an image acquirer 200 and a processor 70. The depth camera 1000 may be provided with a projection window 901 corresponding to the laser projection module 100 and an acquisition window 902 corresponding to the image acquirer 200. The laser projection module 100 is configured to project a laser pattern to a target space through the projection window 901. The image acquirer 200 is configured to acquire a laser pattern modulated by a subject object through the acquisition window 902. In an example, the laser projected by the laser projection module 100 is infrared light, and the image acquirer 200 is an infrared camera. The processor 70 is connected to the laser projection module 100 and the image acquirer 200, and is used to process the laser pattern to obtain the depth image. In some embodiments, the processor 70 calculates a deviation value between each pixel point in the laser pattern and a corresponding pixel point in a reference pattern with an image matching algorithm, and then obtains the depth image of the laser pattern based on the deviation value. The image matching algorithm may be a digital image correlation (DIC) algorithm. Certainly, other image matching algorithms may be adopted to replace the DIC algorithm. The structure of the laser projection module 100 will be further described below.

Figure 3:
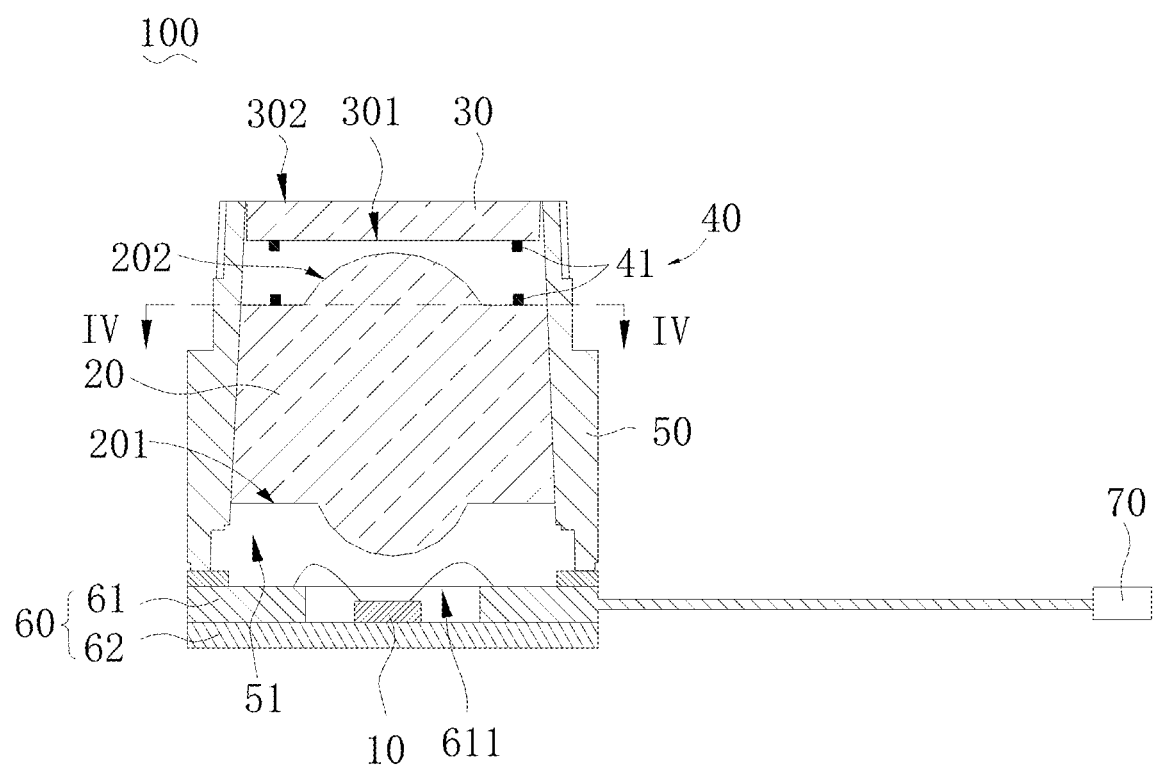
FIG. 3 is a schematic view illustrating a laser projection module according to some embodiments of the present disclosure.

As illustrated in FIG. 3, the laser projection module 100 includes a laser emitter 10, a collimation element 20, a diffraction element 30, a detection component 40, a lens barrel 50, a substrate assembly 60 and a processor 70. The collimation element 20 and the diffraction element 30 are sequentially disposed in an optical path of the laser emitter 10. In some embodiments, the light emitted from the laser emitter 10 passes through the collimation element 20 and the diffraction element 30 in sequence and then exits to the target space. The processor 70 of the laser projection module 100 may also be the processor 70 of the depth camera 1000. In this case, the laser projection module 100 shares the same processor 70 with the depth camera 1000. In this case, the processor 70 may be used to process the laser pattern to obtain the depth image, and also can be used to receive an electrical signal output by the detection component 40 and to detect whether at least one of the collimation element 20 and the diffraction element 30 is abnormal according to the electrical signal output by the detection component 40. When the processor 70 of the laser projection module 100 is not the processor 70 of the depth camera 1000, the laser projection module 100 and the depth camera 1000 do not share the same processor in this case. The processor 70 of the laser projection module 100 is used to receive the electrical signal output by the detection component 40 and to detect whether at least one of the collimation element 20 and the diffraction element 30 is abnormal according to the electrical signal output by the detection component 40, while the processor 70 of the depth camera 1000 is used to process the laser pattern to obtain the depth image. In the embodiment of the present disclosure, an example that the laser projection module 100 and the depth camera 1000 share the same processor 70 is taken for descriptions.

As illustrated in FIG. 3, the substrate assembly 60 includes a substrate 62 and a circuit board 61 carried on the substrate 62. The substrate 62 is used to bear the lens barrel 50, the laser emitter 10 and the circuit board 61. The material of the substrate 62 may be plastic, such as at least one of polyethylene glycol terephthalate (PET), polymethyl methacrylate (PMMA), polycarbonate (PC), and polyimide (PI). That is, the substrate 62 can be made of a single plastic material of any one of PET, PMMA, PC and PI. As such, the substrate 62 is light in weight and has sufficient support strength.

The circuit board 61 may be any one of a printed circuit board, a flexible circuit board, and a rigid-flex printed circuit board. The circuit board 61 may be provided with a via hole 611, and the via hole 611 may be used for accommodating the laser emitter 10 therein. A part of the circuit board 61 is covered by the lens barrel 50, and another part of the circuit board 61 extends out to be connected to the processor 70. The processor 70 may connect the laser projection module 10 to a main board of the electronic device 3000.

As illustrated in FIG. 3, the lens barrel 50 is disposed on the substrate assembly 60 and defines an accommodating chamber 51 together with the substrate assembly 60. In some embodiments, the lens barrel 50 is disposed on the circuit board 61 of the substrate assembly 60 and defines the accommodating chamber 51 together with the circuit board 61 (that is, a side wall 53 of the lens barrel 50 is disposed on the circuit board 61 and defines the accommodating chamber 51 together with the circuit board 61). The lens barrel 50 may be connected to the circuit board 61 of the substrate assembly 60. The lens barrel 50 may be adhered to the circuit board 61 by a glue to improve the airtightness of the accommodating chamber 51. Of course, the lens barrel 50 may be connected to the substrate assembly 60 in other specific connection manners, for example, a snap connection. The accommodating chamber 51 is be used to accommodate components such as the collimation element 20 and the diffraction element 30, and also, the accommodating chamber 51 serves as a part of the optical path of the laser projection module 10. In the embodiment of the disclosure, the lens barrel 50 has a hollow cylindrical shape.

As illustrated in FIGS. 7 to 15, in some embodiments, the lens barrel 50 further includes a bearing stage 52 (i.e., a position limiting projection 52) extending from the side wall 53 of the lens barrel 50 towards the accommodating chamber 51. In some embodiments, the bearing stage 52 protrudes from the side wall 53 of the lens barrel 50 into the accommodating chamber 51. The bearing stage 52 is arranged between the collimation element 20 and the diffraction element 30. The bearing stage 52 may have a continuous ring shape. Or, a plurality of bearing stage 52 are provided and spaced apart from one another. The bearing stage 52 defines a light passing hole 1231, the light passing hole 1231 serves as a part of the accommodating chamber 51, and the laser passes through the light passing hole 1231 and then penetrates into the diffraction element 30. Further, during the assembling of the laser projection module 100, when the diffraction element 30 abuts against the bearing stage 52, the diffraction element 30 may be considered to be mounted in place. When the collimation element 20 abuts against the bearing stage 52, the collimation element 20 may be considered to be mounted in place. The bearing stage 52 includes a position limiting surface 1232, and the position limiting surface 1232 is bonded with the diffraction element 30 when the diffraction element 30 is mounted on the bearing stage 52.

Figure 17:
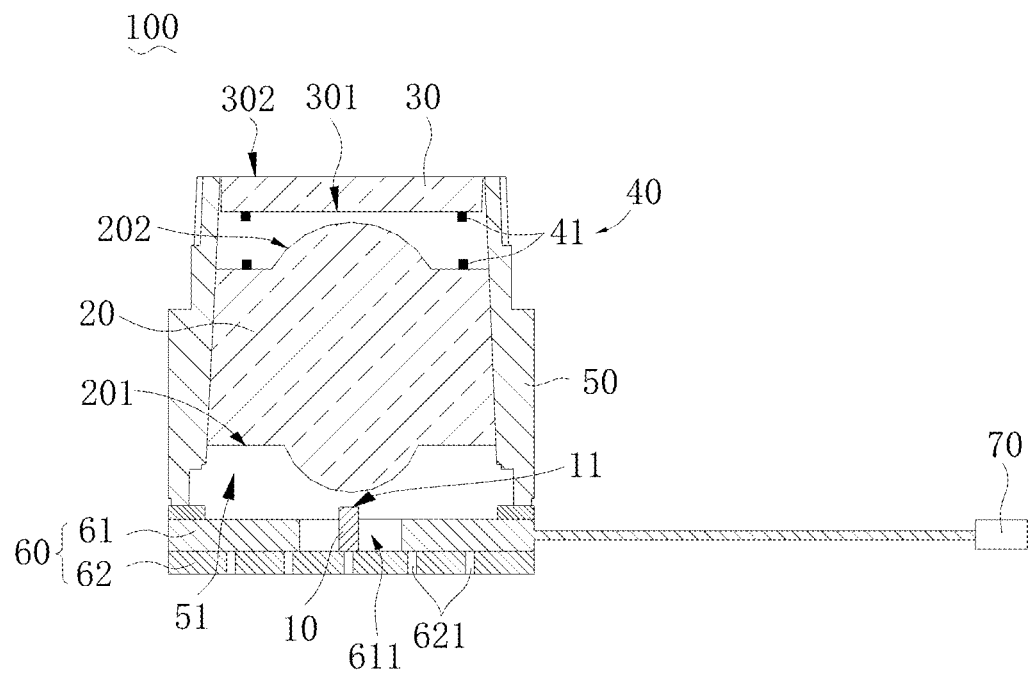
FIG. 17 and FIG. 18 are schematic views illustrating a laser projection module according to some embodiments of the present disclosure.

As illustrated in FIG. 3, the laser emitter 10 is disposed on the substrate assembly 60. In some embodiments, the laser emitter 10 may be disposed on the circuit board 61 and electrically connected to the circuit board 61, and the laser emitter 10 may also be disposed on the substrate 62 and correspond to the via hole 611 (i.e., the laser emitter 10 is carried on the substrate 62 and housed in the via hole 611). In this case, the laser emitter 10 may be electrically connected to the circuit board 61 by arranging wires. The laser emitter 10 is electrically connected to the processor 70 via the circuit board 61. The laser emitter 10 is used to emit a laser, and the laser may be the infrared light. In an example, the laser emitter 10 may include a semiconductor substrate and an emitting laser disposed on the semiconductor substrate, the semiconductor substrate is disposed on substrate 62, and the laser emitter may be a vertical-cavity surface-emitting laser (VCSEL). The semiconductor substrate may be provided with a single emitting laser or a laser array composed of a plurality of emitting lasers. In some embodiments, the plurality of emitting lasers may be arranged on the semiconductor substrate in a regular or irregular two-dimensional pattern. The substrate 62 has a heat-dissipation hole 621 (as illustrated in FIG. 17), and heat generated by the operation of the laser emitter 10 or the circuit board 61 can be dissipated through heat-dissipation hole 621. The heat-dissipation holes 621 may be further filled with a thermal conductive glue to further improve the heat dissipation performance of the substrate 62.

As illustrated in FIG. 3, the collimation element 20 may be an optical lens and is used for collimating the laser emitted by the laser emitter 10. Besides, the collimation element 20 is housed in the accommodating chamber 51. The collimation element 20 includes an optical portion and a mounting portion, and the mounting portion is used for engaging with the side wall 53 of the lens barrel 50 and fixing the collimation element 20. In an embodiment of the present disclosure, the optical portion includes a collimating incidence surface 201 and a collimation emergence surface 202 located on two opposite sides of the collimation element 20.

Figure 7:
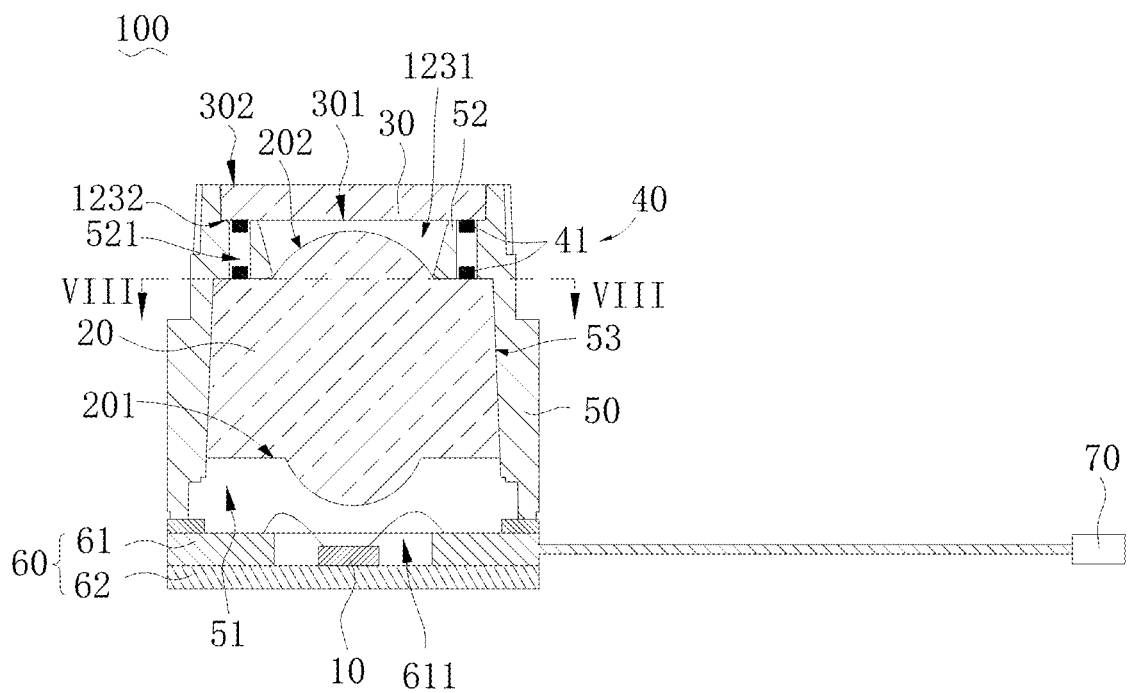
FIG. 7 is a schematic view illustrating a laser projection module according to some embodiments of the present disclosure.
Figure 15:
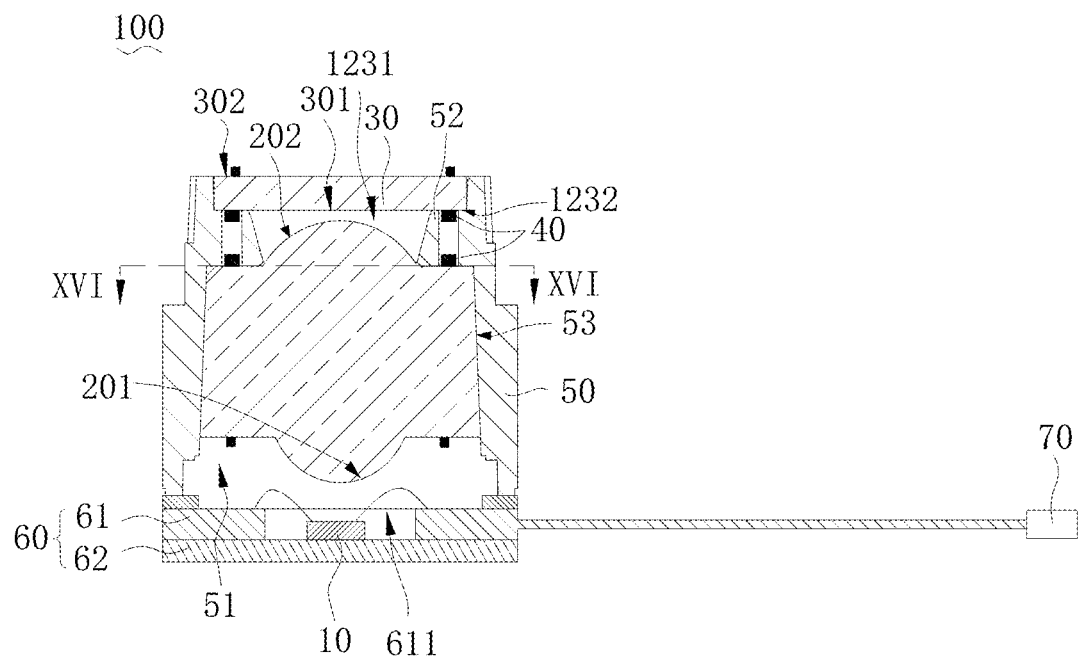
FIG. 15 is a schematic view illustrating a laser projection module according to some embodiments of the present disclosure.
Figure 16:
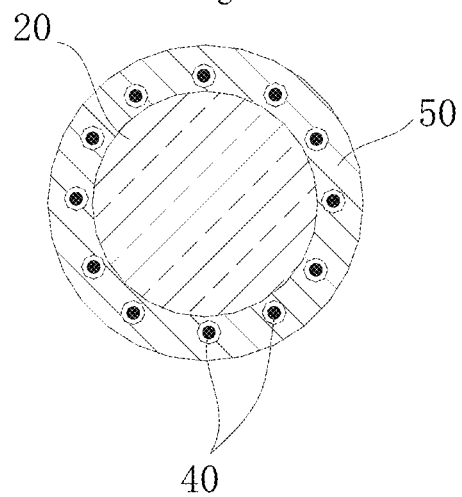
FIG. 16 is a sectional view of the laser projection module taken along line XVI-XVI in FIG. 15.

As illustrated in FIGS. 7 and 15, when the lens barrel 50 includes the bearing stage 52, the diffraction element 30 is mounted on the bearing stage 52. In some embodiments, the diffraction element 30 is bonded with the position limiting surface 1232 to be mounted on the bearing stage 52. The outer surface of the diffraction element 30 includes a diffraction emergence surface 302 and a diffraction incidence surface 301. The diffraction emergence surface 302 and the diffraction incidence surface 301 are opposite to each other. Further, the diffraction incidence surface 301 is bonded with the position limiting surface 1232, when the diffraction element 30 is mounted on the bearing stage 52. In the embodiment of the present disclosure, the diffraction incidence surface 301 is provided with a diffraction structure, and the diffraction emergence surface 302 may be a smooth plane. The diffraction element 30 can project the laser collimated by the collimation element 20 in a pattern corresponding to the diffraction structure. The diffraction element 30 may be made of glass or composite plastic such as PET.

As illustrated in FIG. 3, the detection component 40 is disposed to the collimation element 20 and the diffraction element 30, and is used to output an electrical signal. The processor 70 is connected to the detection component 40. The processor 70 may be used to receive the electrical signal output by the detection component 40 and detect whether at least one of the collimation element 20 and the diffraction element 30 is abnormal according to the electrical signal output by the detection component 40. The abnormality of the collimation element 20 means that the collimation element 20 is broken, inclined, or fallen from the laser projection module 100, and the abnormality of the diffraction element 30 means that the diffraction element 30 is broken, inclined, or fallen from the laser projection module 100.

In an embodiment, the detection component 40 is arranged to the collimation element 20 and the diffraction element 30 for detecting a distance between the collimation element 20 and the diffraction element 30 and outputting an electrical signal. The processor 70 is connected to the detection component 40. The processor 70 is used to receive the electrical signal output by the detection component 40, judge whether the electrical signal is in a preset range, and determine that the distance between the collimation element 20 and the diffraction element 30 changes beyond a predetermined interval when the electrical signal is not in the preset range.

It can be understood that when the laser projection module 100 is normally used, the laser emitted by the laser emitter 10 exits through the collimation element 20 and the diffraction element 30 in sequence. Thus, the collimation element 20 and the diffraction element 30 have a certain energy attenuation effect on the laser, so as to ensure that the energy of the emergent laser will not be too large and hurt human eyes. However, when the laser projection module 100 encounters falling or the like, the collimation element 20 and the diffraction element 30 arranged in the laser projection module 100 may fall off or incline from the laser projection module 100, such that the laser of the laser emitter 10 may directly emit without passing through or completely passing through at least one of the collimation element 20 and the diffraction element 30. As a result, the emergent laser is not attenuated by at least one of the collimation element 20 and the diffraction element 30, and hence the energy of the laser reaching the human eyes may be too high, thus causing damage to the human eyes.

In the laser projection module 100 of the embodiment of the present disclosure, the detection component 40 is arranged to the collimation element 20 and the diffraction element 30, the distance between the collimation element 20 and the diffraction element 30 is detected by the detection component 40, and it is determined that at least one of the collimation element 20 and the diffraction element 30 is fallen off or inclined when the distance between the collimation element 20 and the diffraction element 30 changes and the change value exceeds the predetermined interval. In this case, the processor 70 may immediately turn off the laser emitter 10 or reduce an emission power of the laser emitter 10, thereby avoiding the problem that the user's eyes may be injured when the energy of the emergent laser is excessively large due to the inclination or fall-off of the at least one of the collimation element 20 and the diffraction element 30, and improving the safety of using the laser projection module 100.

As illustrated in FIG. 3 to FIG. 6, in some embodiments, when the side wall 53 of the lens barrel 50 is not provided with the bearing stage 52 extending into the accommodating chamber 51, the detection component 40 may be configured in following manners.

Figure 4:
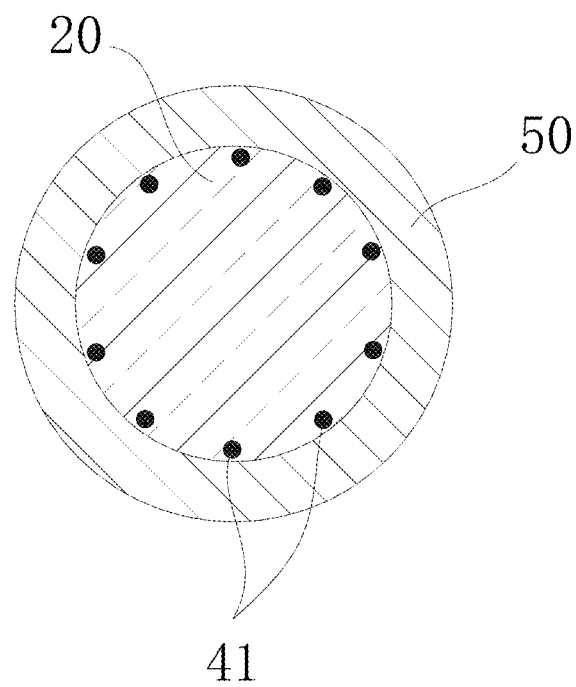
FIG. 4 is a sectional view of the laser projection module taken along line IV-IV in FIG. 3.

As illustrated in FIGS. 3 and 4, the detection component 40 may include two detection electrodes 41 which are oppositely arranged to form a capacitor. The collimation element 20 includes the collimation incident surface 201 and the collimation emergence surface 202, and the diffraction element 30 includes the diffraction incidence surface 301 and the diffraction emergence surface 302. The two detection electrodes 41 may have following positions. One detection electrode 41 is disposed to the collimation emergence surface 202, and the other detection electrode 41 is disposed to the diffraction incidence surface 301 (as illustrated in FIG. 3). Or, one detection electrode 41 is disposed to the collimation emergence surface 202, and the other detection electrode 41 is disposed to the diffraction emergence surface 302 (not illustrated). Or, one detection electrode 41 is disposed to the collimation incidence surface 201, and the other detection electrode 41 is disposed to the diffraction incidence surface 301 (not illustrated). Or, one detection electrode 41 is disposed to the collimation incidence surface 201, and the other detection electrode 41 is disposed to the diffraction emergence surface 302 (not illustrated). The detection electrode 41 may be made of a light-transmitting conductive material such as indium tin oxide (ITO) or indium zinc oxide (IZO) so as not to affect light-emitting paths of the collimation element 20 and the diffraction element 30. Or, the detection electrode 41 may be disposed to non-optical portions of the collimation element 20 and the diffraction element 30 (for example, a non-convex portion of the collimation element 20 and a non-diffraction grating portion of the diffraction element 30). One pair or a plurality of pairs of the detection electrodes 41 may be provided. When the plurality of pairs of the detection electrodes 41 are provided, the plurality of pairs of the detection electrodes 41 may be uniformly distributed along peripheries of the collimation element 20 and the diffraction element 30 (as illustrated in FIG. 4). It can be understood that a capacitor is formed between two opposite detection electrodes 41, and a capacitance of the capacitor changes correspondingly after a distance between the two detection electrodes 41 is changed. The electrical signal output to the processor 70 can reflect the capacitance of the two detection electrodes 41, such that the distance between the two detection electrodes 41 can be obtained according to the electrical signal, and the distance between the collimation element 20 and the diffraction element 30 can be further obtained. When the collimation element 20 and the diffraction element 30 are not fallen off or not inclined, the distance between the collimation element 20 and the diffraction element 30 does not change or changes within the predetermined interval. When any one of the collimation element 20 and the diffraction element 30 is fallen off or inclined, the distance between the collimation element 20 and the diffraction element 30 changes, and the electrical signal obtained by the processor 70 can reflect the change and indicate the distance between the collimation element 20 and the diffraction element 30 after the change. In some embodiments, when the distance between the collimation element 20 and the diffraction element 30 changes within the predetermined interval, that is, when the distance between the collimation element 20 and the diffraction element 30 changes little, the collimation element 20 and the diffraction element 30 can still operate normally. In this case, the processor 70 does not need to turn off the laser emitter 10 or reduce the emission power of the laser emitter 10. However, when the distance between the collimation element 20 and the diffraction element 30 changes much, that is, the distance change exceeds the predetermined interval, the processor 70 needs to perform operations of turning off the laser emitter 10 or reducing the emission power of the laser emitter 10, so as to avoid the problem that the user's eyes may be injured when the energy of the emergent laser is too large.

Figure 5:
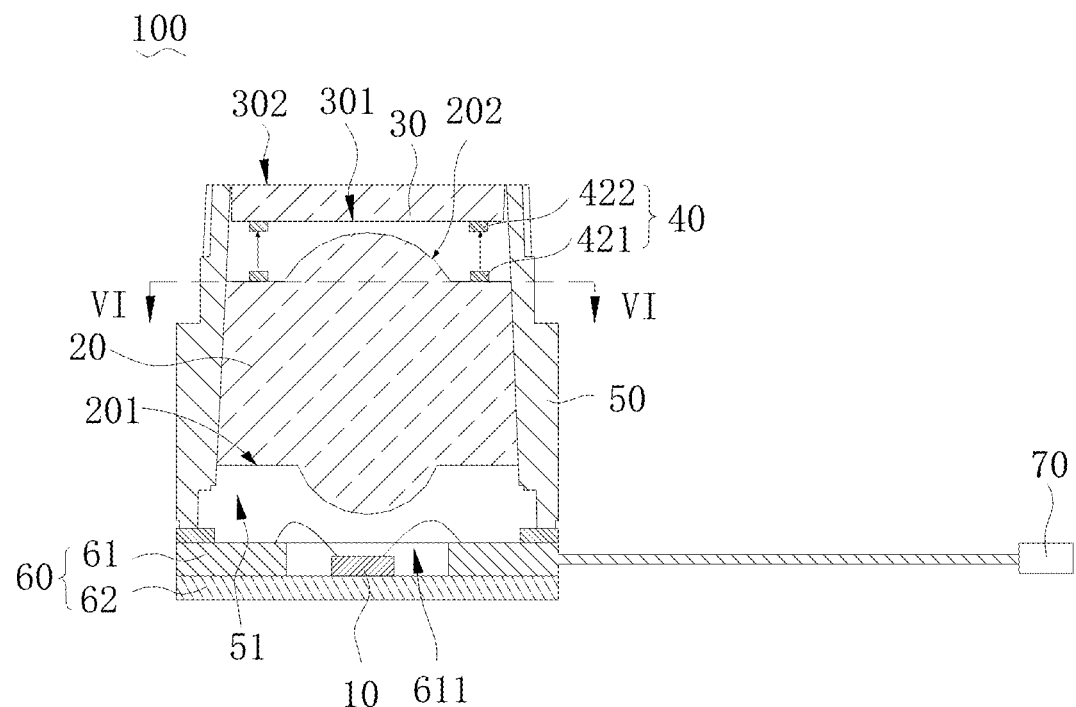
FIG. 5 is a schematic view illustrating a laser projection module according to some embodiments of the present disclosure.
Figure 6:
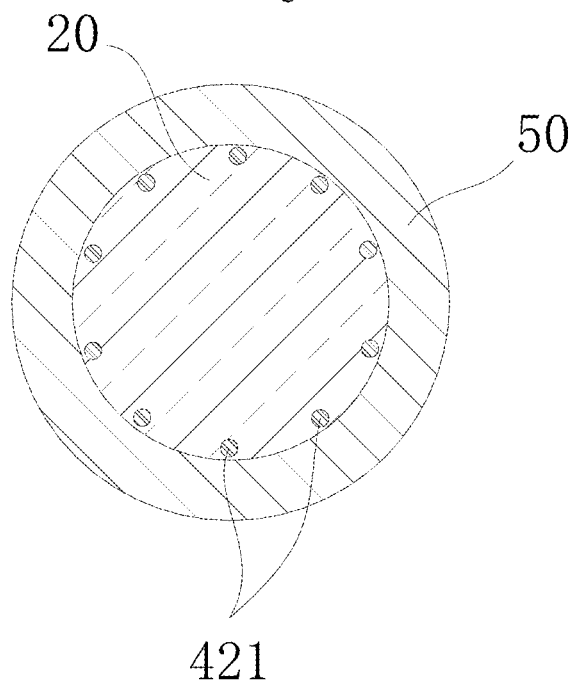
FIG. 6 is a sectional view of the laser projection module taken along line VI-VI in FIG. 5.

As illustrated in FIGS. 5 and 6, the detection component 40 may also include an emitter 421 and a receiver 422. The emitter 421 and the receiver 422 are respectively disposed to the collimation element 20 and the diffraction element 30. In some embodiments, the emitter 421 is disposed on the collimation emergence surface 202, and the receiver 422 is disposed to the diffraction incidence surface 301 (as illustrated in FIG. 5). Alternatively, the emitter 421 and the receiver 422 are respectively disposed to the diffraction element 30 and the collimation element 20. In some embodiments, the emitter 421 is disposed to the diffraction incidence surface 301, and the receiver 422 is disposed on the collimation emergence surface 202 (not illustrated). The emitter 421 and the receiver 422 should be disposed to the non-optical portions of the collimation element 20 and the diffraction element 30 (for example, the non-convex portion of the collimation element 20 and the non-diffraction grating portion of the diffraction element 30) so as to avoid affecting the light-emitting paths of the collimation element 20 and the diffraction element 30. One pair of the emitter 421 and the receiver 422 or a plurality of pairs of the emitters 421 and the receivers 422 may be provided. When the plurality of pairs of the emitters 421 and the receivers 422 are provided, the plurality of pairs of the emitters 421 and the receivers 422 may be evenly distributed along the peripheries of the collimation element 20 and the diffraction element 30 (as illustrated in FIG. 6). The emitter 421 may be used to emit a light or an ultrasonic wave, and the receiver 422 may be used to receive the light or the ultrasonic wave emitted by the corresponding emitter 421. The light or the ultrasonic wave received by the receiver 422 may be converted into an electrical signal, and the strength of the electrical signal may be used to indicate the strength of the light or the ultrasonic wave and further indicate the distance between the collimation element 20 and the diffraction element 30. In addition, the distance between the collimation element 20 and the diffraction element 30 may also be calculated based on a time difference between a time point when the emitter 421 emits the light or the ultrasonic wave and another time point when the receiver 422 receives the light or the ultrasonic wave. Or, the distance between the collimation element 20 and the diffraction element 30 may also be calculated based on a phase difference between the light emitted by the emitter 421 and the light received by the receiver 422. When the collimation element 20 and the diffraction element 30 are not fallen off or not inclined, the distance between the collimation element 20 and the diffraction element 30 does not change or changes within the predetermined interval. When any one of the collimation element 20 and the diffraction element 30 is fallen off or inclined, the distance between the collimation element 20 and the diffraction element 30 changes. The electrical signals obtained by the processor 70 from the emitter 421 and the receiver 422 may reflect the change and indicate the distance between the varying collimation element 20 and the diffraction element 30. In some embodiments, when the change of the distance between the collimation element 20 and the diffraction element 30 is within the predetermined interval, that is, the change of the distance between the collimation element 20 and the diffraction element 30 is small, the collimation element 20 and the diffraction element 30 can still operate normally. In this case, the processor 70 does not need to turn off the laser emitter 10 or reduce the transmission power of the laser emitter 10. When the change of the distance between the collimation element 20 and the diffraction element 30 is large, that is, the distance change exceeds the predetermined interval, and thus, the processor 70 needs to perform operations of turning off the laser emitter 10 or reducing the transmission power of the laser emitter 10 so as to avoid the problem that the user's eyes may be injured when the energy of the emergent laser is too large. In addition, when the emitter 421 emits light, the wavelength of this light should be inconsistent with the wavelength of the laser emitted by the laser emitter 10, so as to avoid affecting formation of the laser pattern.

As illustrated in FIGS. 7 to 12, in some embodiments, when the side wall 53 of the lens barrel 50 is provided with the bearing stage 52 extending into the accommodating chamber 51, the detection component 40 may be configured in following manners.

Figure 8:
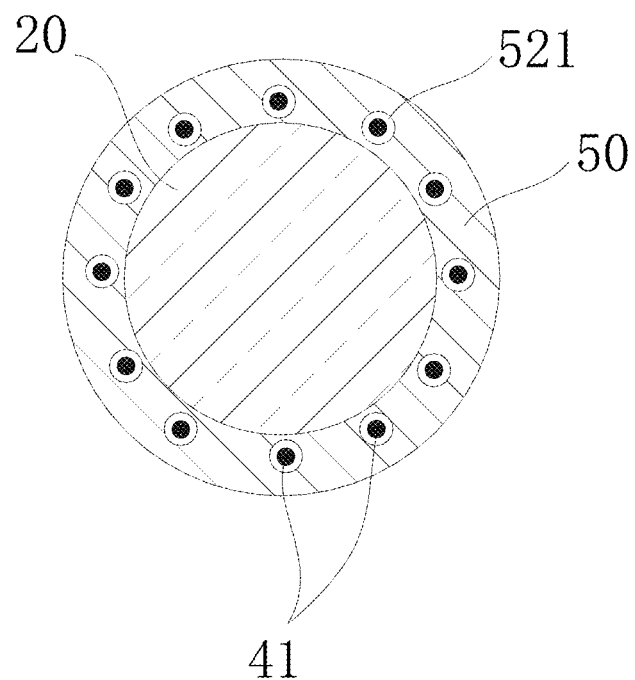
FIG. 8 is a sectional view of the laser projection module taken along line VIII-VIII in FIG. 7.
Figure 9:
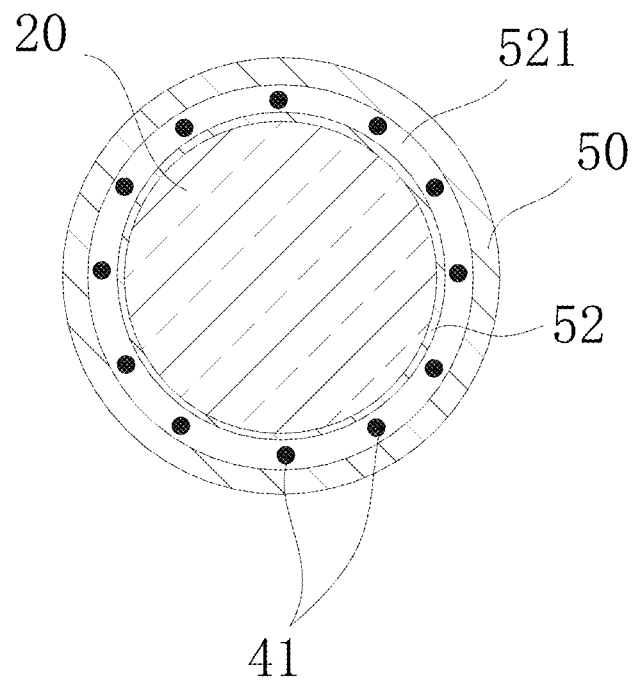
FIG. 9 is a sectional view of a laser projection module according to another embodiment of the present disclosure, taken along a same section line with line VIII-VIII in FIG. 7.

As illustrated in FIGS. 7 to 9, the detection component 40 may include two detection electrodes 41 which are oppositely arranged to form a capacitor. The collimation element 20 includes the collimation incidence surface 201 and the collimation emergence surface 202, the diffraction element 30 includes the diffraction incidence surface 301 and the diffraction emergence surface 302, and the bearing stage 52 is provided with a through hole 521. The two detection electrodes 41 may have following positions. One detection electrode 41 is disposed on the collimation emergence surface 202, the other detection electrode 41 is disposed to the diffraction incidence surface 301, and both detection electrodes 41 are accommodated in the through hole 521 to form the capacitor (as illustrated in FIG. 7). In this case, the detection electrode 41 may be made of a light-transmitting conductive material such as indium tin oxide (ITO) or indium zinc oxide (IZO), so as not to affect the light-emitting paths of the collimation element 20 and the diffraction element 30, or may be made of any light-tight material. One pair or a plurality of pairs of the detection electrodes 41 may be provided. When the plurality of pairs of the detection electrodes 41 are provided, the plurality of pairs of the detection electrodes 41 may be uniformly distributed along the peripheries of the collimation element 20 and the diffraction element 30. In this case, a plurality of the through holes 521 may be provided in the bearing stage 52, the plurality of the through holes 521 are in one-to-one correspondence with the plurality of pairs of the detection electrodes 41, and each pair of detection electrodes 41 are accommodated in one through hole 521 (as illustrated in FIG. 8). Or, the through hole 521 of the bearing stage 52 is an annular through hole 521, and the plurality of pairs of the detection electrodes 41 are accommodated in the annular through hole 521 (as illustrated in FIG. 9). It can be understood that a capacitor is formed between two opposite detection electrodes 41, and the capacitance of the capacitor changes correspondingly after the distance between the two detection electrodes 41 is changed. The electrical signal output to the processor 70 can reflect the capacitance of the two detection electrodes 41, such that the distance between the two detection electrodes 41 can be obtained according to the electrical signal, and the distance between the collimation element 20 and the diffraction element 30 can be further obtained. When the collimation element 20 and the diffraction element 30 are not fallen off or not inclined, the distance between the collimation element 20 and the diffraction element 30 does not change or changes within the predetermined interval. When any one of the collimation element 20 and the diffraction element 30 is fallen off or inclined, the distance between the collimation element 20 and the diffraction element 30 changes, and the electrical signal obtained by the processor 70 can reflect the change and indicate the distance between the collimation element 20 and the diffraction element 30 after the change. In some embodiments, when the distance between the collimation element 20 and the diffraction element 30 changes within the predetermined interval, that is, when the distance between the collimation element 20 and the diffraction element 30 changes little, the collimation element 20 and the diffraction element 30 can still operate normally. In this case, the processor 70 does not need to turn off the laser emitter 10 or reduce the emission power of the laser emitter 10. However, when the distance between the collimation element 20 and the diffraction element 30 changes much, that is, the distance change exceeds the predetermined interval, the processor 70 needs to perform operations of turning off the laser emitter 10 or reducing the emission power of the laser emitter 10, so as to avoid the problem that the user's eyes may be injured when the energy of the emergent laser is too large.

Figure 10:
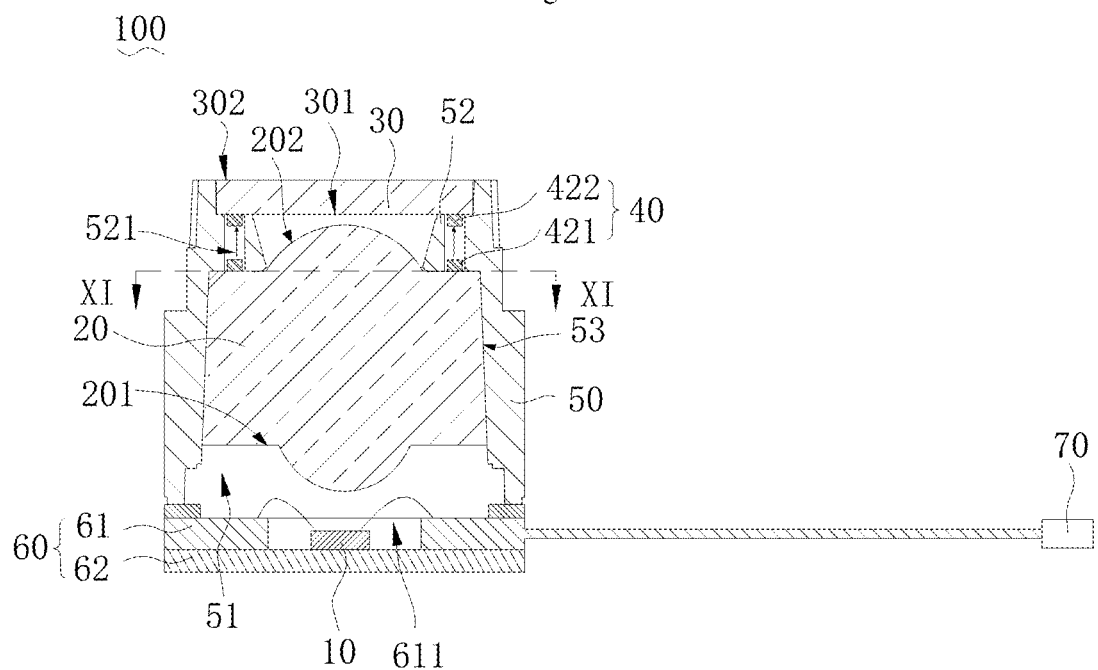
FIG. 10 is a schematic view illustrating a laser projection module according to some embodiments of the present disclosure.
Figure 11:
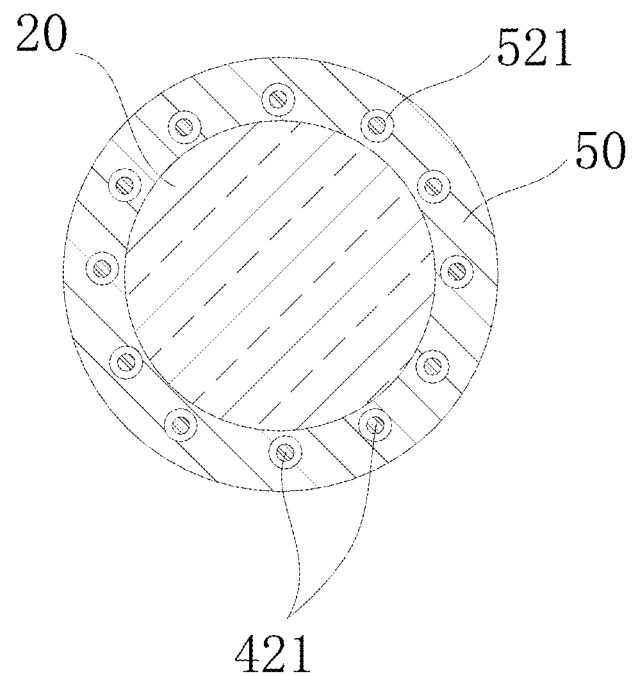
FIG. 11 is a sectional view of the laser projection module taken along line XI-XI in FIG. 10.
Figure 12:
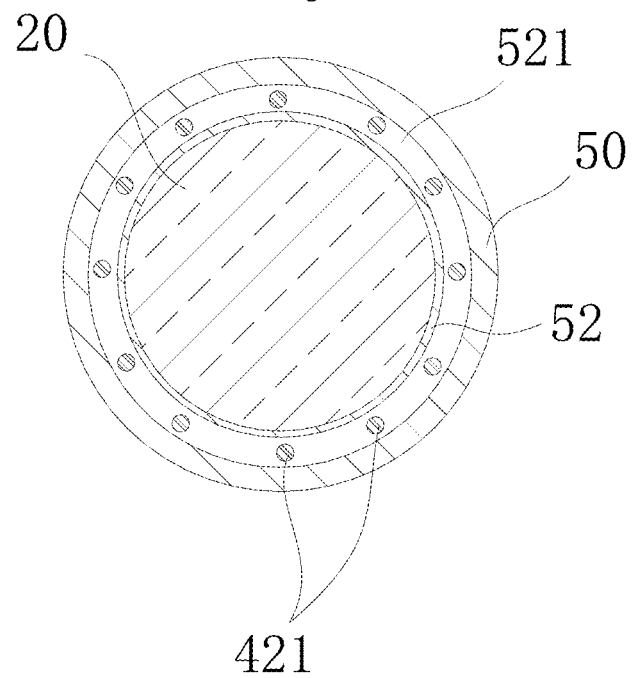
FIG. 12 is a sectional view of a laser projection module according to another embodiment of the present disclosure, taken along a same section line with line XI-XI in FIG. 10.
Figure 13:
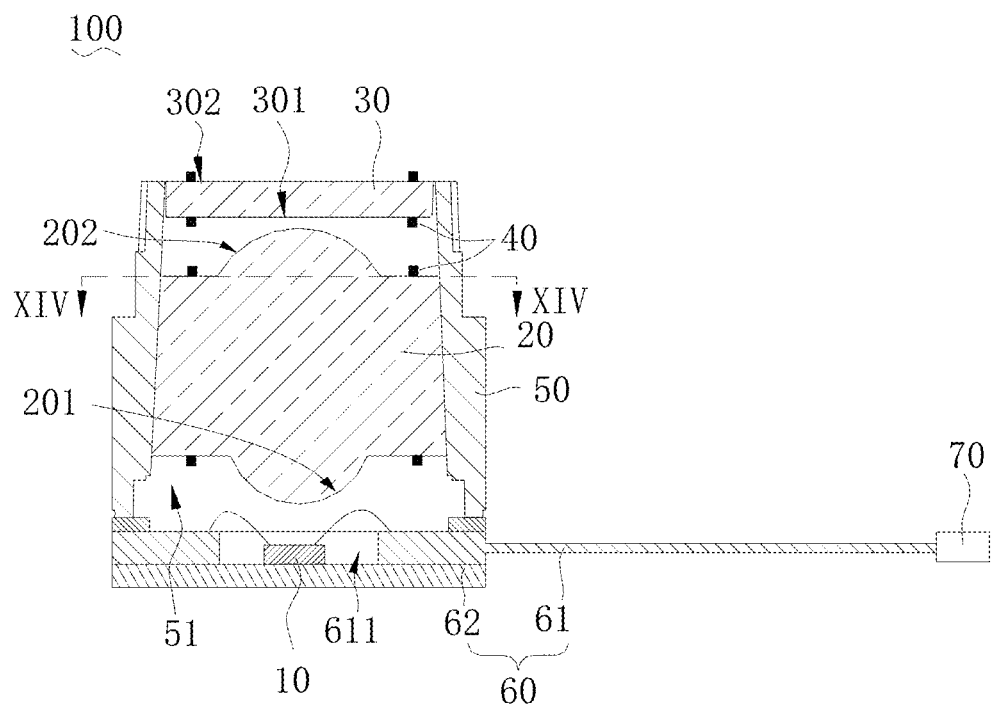
FIG. 13 is a schematic view illustrating a laser projection module according to some embodiments of the present disclosure.
Figure 14:
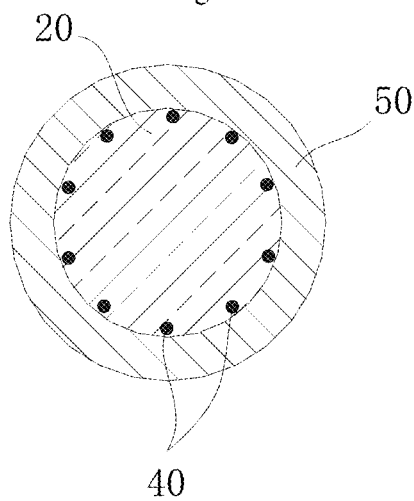
FIG. 14 is a sectional view of the laser projection module taken along line XIV-XIV in FIG. 13.

As illustrated in FIGS. 10 to 12, the detection component 40 may also include an emitter 421 and a receiver 422. The emitter 421 and the receiver 422 are respectively disposed to the collimation element 20 and the diffraction element 30. The bearing stage 52 is provided with the through hole 521. In some embodiments, the emitter 421 is disposed on the collimation emergence surface 202, the receiver 422 is disposed to the diffraction incidence surface 301, and both the emitter 421 and the receiver 422 are accommodated in the through hole 521 (as illustrated in FIG. 10). In this case, the emitter 421 and the receiver 422 should be disposed to the non-optical portions of the collimation element 20 and the diffraction element 30 (for example, the non-convex portion of the collimation element 20 and the non-diffraction grating portion of the diffraction element 30), so as to avoid affecting the light-emitting paths of the collimation element 20 and the diffraction element 30. One pair of the emitter 421 and the receiver 422 or a plurality of pairs of the emitters 421 and the receivers 422 may be provided. When the plurality of pairs of the emitters 421 and the receivers 422 are provided, the plurality of pairs of the emitters 421 and the receivers 422 may be evenly distributed along the peripheries of the collimation element 20 and the diffraction element 30. In this case, a plurality of the through holes 521 may be provided in the bearing stage 52, and the plurality of the through holes 521 are in one-to-one correspondence with the plurality of pairs of the emitters 421 and the receivers 422, and each pair of the emitter 421 and the receiver 422 are accommodated in one through hole 521 (as illustrated in FIG. 11). Or, the through hole 521 of the bearing stage 52 is an annular through hole 521, and the plurality of pairs of the emitters 421 and the receivers 422 are accommodated in the annular through hole 521 (as illustrated in FIG. 12). The emitter 421 may be used to emit a light or an ultrasonic wave, and the receiver 422 can be used to receive the light or the ultrasonic wave emitted by the corresponding emitter 421. The light or the ultrasonic wave received by the receiver 422 may be converted into an electrical signal, and the strength of the electrical signal may be used to indicate the strength of the light or the ultrasonic wave and further indicate the distance between the collimation element 20 and the diffraction element 30. In addition, the distance between the collimation element 20 and the diffraction element 30 may also be calculated based on the time difference between the time point when the emitter 421 emits the light or the ultrasonic wave and the time point when the receiver 422 receives the light or the ultrasonic wave. Or, the distance between the collimation element 20 and the diffraction element 30 may also be calculated based on the phase difference between the light emitted by the emitter 421 and the light received by the receiver 422. When the collimation element 20 and the diffraction element 30 are not fallen off or not inclined, the distance between the collimation element 20 and the diffraction element 30 does not change or changes within the predetermined interval. When any one of the collimation element 20 and the diffraction element 30 is fallen off or inclined, the distance between the collimation element 20 and the diffraction element 30 changes. The electrical signals obtained by the processor 70 from the emitter 421 and the receiver 422 may reflect the change and indicate the distance between the varying collimation element 20 and the diffraction element 30 after the change. In some embodiments, when the change of the distance between the collimation element 20 and the diffraction element 30 is within the predetermined interval, that is, the change of the distance between the collimation element 20 and the diffraction element 30 is small, the collimation element 20 and the diffraction element 30 can still operate normally. In this case, the processor 70 does not need to turn off the laser emitter 10 or reduce the transmission power of the laser emitter 10. When the distance between the collimation element 20 and the diffraction element 30 changes much, that is, the distance change exceeds the predetermined interval, and thus, the processor 70 needs to perform operations of turning off the laser emitter 10 or reducing the transmission power of the laser emitter 10, so as to avoid the problem that the user's eyes may be injured when the energy of the emergent laser is too large. In addition, when the emitter 421 emits light, the wavelength of the light should be inconsistent with the wavelength of the laser emitted by the laser emitter 10 so as to avoid affecting formation of the laser pattern.

As illustrated in FIGS. 13 to 16, in another embodiment, the detection component 40 may include a pair of detection electrodes respectively disposed to the incidence surface and the emergence surface of at least one of the collimation element 20 and the diffraction element 30. That is, the collimation element 20 is provided with a pair of detection electrodes, and two electrodes of the pair of detection electrodes are disposed to the collimation incidence surface 201 and the collimation emergence surface 202, respectively. Or, the diffraction element 30 is provided with a pair of detection electrodes, and two electrodes of the pair of detection electrodes are disposed to the diffraction incidence surface 301 and the diffraction emergence surface 302, respectively. Or, the collimation element 20 and the diffraction element 30 are each provided with a pair of detection electrodes, two electrodes of the pair of detection electrodes provided to the collimation element 20 are respectively disposed to the collimation incidence surface 201 and the collimation emergence surface 202, and two electrodes of the pair of detection electrodes provided to the diffraction element 30 are respectively disposed to the diffraction incidence surface 301 and the diffraction emergence surface 302. The pair of detection electrodes output an electrical signal after being energized, and the processor 70 detects the state of the collimation element 20 according to the change of the electrical signal output by the pair of detection electrodes provided to the collimation element 20, and detects the state of the diffraction element 30 according to the change of the electrical signal output by the pair of detection electrodes provided to the diffraction element 30. In some embodiments, the processor 70 detects whether the collimation element 20 and the diffraction element 30 are broken respectively according to the changes of the output electrical signals. It can be understood that when the laser projection module 100 is normally used, the laser emitted by the laser emitter 10 exits through the collimation element 20 and the diffraction element 30 in sequence. The collimation element 20 and the diffraction element 30 have a certain energy attenuation effect on the laser, so as to ensure that the energy of the emergent laser is not too large and will not damage the human eyes. However, when the laser projection module 100 encounters falling or the like, the collimation element 20 and the diffraction element 30 arranged in the laser projection module 100 may be damaged, such that the laser of the laser emitter 10 may directly emit through the damaged portion without passing through at least one of the collimation element 20 and the diffraction element 30. As a result, the emergent laser is not attenuated by at least one of the collimation element 20 and the diffraction element 30, and hence the energy of the laser reaching the human eyes may be too high, thus causing damage to the human eyes.

In some examples, the bearing stage 52 is provided with the through hole 521, and the detection electrode arranged to at least one of the collimation emergence surface 202 and the diffraction incidence surface 301 may be received in the through hole 521.

In some embodiments, a plurality of the through holes 521 may be provided, and the plurality of the through holes 521 are in one-to-one correspondence with the plurality of pairs of detection electrodes, and the detection electrode arranged to at least one of the collimation emergence surface 202 and the diffraction incidence surface 301 is received in the through hole 521.

In the laser projection module 100 of the embodiment of the present disclosure, the detection component 40 is arranged to at least one of the collimation element 20 and the diffraction element 30, and it is detected whether the at least one of the collimation element 20 and the diffraction element 30 is broken by the detection component 40 detecting the electrical signal of the at least one of the collimation element 20 and the diffraction element 30. The processor 70 can immediately turn off the laser emitter 10 or reduce the emission power of the laser emitter 10 when the at least one of the collimation element 20 and the diffraction element 30 is broken, thereby avoiding the problem that the user's eyes may be damaged when the energy of the emergent laser is excessively large due to the damage of the at least one of the collimation element 20 and the diffraction element 30, and improving the safety of using the laser projection module 100.

In some embodiments, the pair of detection electrodes form a capacitor, and the processor 70 is used for determining whether the at least one of the collimation element 20 and the diffraction element 30 is broken according to the change of the capacitance of the capacitor.

In some embodiments, the pair of detection electrodes may be made of a light-transmitting conductive material such as indium tin oxide (ITO) or indium zinc oxide (IZO), so as not to affect the light-emitting paths of the collimation element 20 and the diffraction element 30. Or, the pair of detection electrodes may be disposed to the non-optical portions of the collimation element 20 and the diffraction element 30 (for example, the non-convex portion of the collimation element 20 and the non-diffraction grating portion of the diffraction element 30). One pair or a plurality of pairs of detection electrodes may be provided. When the plurality of pairs of detection electrodes are provided, the plurality of pairs of detection electrodes may be uniformly distributed along the periphery of the at least one of the collimation element 20 and the diffraction element 30. It can be understood that a capacitor is formed between the two electrodes of each pair of detection electrodes. When the element is broken, the distance between the two electrodes of each pair of detection electrodes changes, and the capacitance of the capacitor changes accordingly. The electrical signal output to the processor 70 may reflect the capacitance of the two electrodes, so as to determine whether the at least one of the collimation element 20 and the diffraction element 30 is broken. When the collimation element 20 and the diffraction element 30 are not broken, the distance between the two electrodes of each pair of detection electrodes disposed to the collimation element 20 and the diffraction element 30 does not change. When any one of the collimation element 14 and the diffraction element 30 is broken, the distance between the two electrodes of the pair of detection electrodes disposed to this element changes. The electrical signal obtained by processor 70 may reflect the change and indicate whether the collimation element 20 and the diffraction element 30 are broken after the change. In some embodiments, when the change of the distance between the two electrodes of the pair of detection electrodes is within the predetermined interval, that is, when the distance between the two electrodes of the respective pair of detection electrodes of the collimation element 20 and the diffraction element 30 changes little, the collimation element 20 and the diffraction element 30 can still operate normally. In this case, the processor 70 does not need to turn off the laser emitter 10 or reduce the emission power of the laser emitter 10. However, when the distance between the two electrodes of any pair of detection electrodes disposed to the collimation element 20 and the diffraction element 30 changes much, that is, the distance change exceeds the predetermined interval, and thus the processor 70 needs to perform operations of turning off the laser emitter 10 or reducing the emission power of the laser emitter 10, so as to avoid the problem that the user's eyes may be injured when the energy of the emergent laser is too large.

In some embodiments, the detection component 40 may also include the emitter and the receiver. The emitter and the receiver are respectively disposed to the collimation incidence surface 201 and the collimation emergence surface 202, and/or to the diffraction incidence surface 301 and the diffraction emergence surface 302. That is, the emitter and the receiver are respectively disposed to the incidence surface and the emergence surface of at least one of the collimation element 20 and the diffraction element 30. In some embodiments, the emitter is disposed to the incidence surface of the at least one of the collimation element 20 and the diffraction element 30, and the receiver is disposed to the emergence surface of the at least one of the collimation element 20 and the diffraction element 30. In other embodiments, the emitter is disposed to the emergence surface of the at least one of the collimation element 20 and the diffraction element 30, and the receiver is disposed to the incidence surface of the at least one of the collimation element 20 and the diffraction element 30.

In some embodiments, the emitter and the receiver should be disposed to the non-optical portions of the collimation element 20 and the diffraction element 30 (for example, the non-convex portion of the collimation element 20 and the non-diffraction grating portion of the diffraction element 30), so as to avoid affecting the light-emitting paths of the collimation element 20 and the diffraction element 30. One pair of the emitter and the receiver or a plurality of pairs of the emitters and the receivers may be provided. When the plurality of pairs of the emitters and the receivers are provided, the plurality of pairs of the emitters and the receivers may be evenly distributed along the periphery of the at least one of the collimation element 20 and the diffraction element 30. The emitter may be used to emit a light or an ultrasonic wave, and the receiver may be used to receive the light or the ultrasonic wave emitted by the corresponding emitter. The light or the ultrasonic wave received by the receiver may be converted into an electrical signal, and the strength of the electrical signal may be used to indicate the strength of the light or the ultrasonic wave and further indicate the distance between the incidence surface and the emergence surface of the at least one of the collimation element 20 and the diffraction element 30. In addition, the distance between the incidence surface and the emergence surface of the at least one of the collimation element 20 and the diffraction element 30 may also be calculated based on the time difference between the time point when the emitter emits the light or the ultrasonic wave and the time point when the receiver receives the light or the ultrasonic wave. Or, the distance between the incidence surface and the emergence surface of the at least one of the collimation element 20 and the diffraction element 30 may also be calculated based on the phase difference between the light emitted by the emitter and the light received by the receiver. When the collimation element 20 and the diffraction element 30 are not broken, the distance between the incidence surface and the emergence surface of each of the collimation element 20 and the diffraction element 30 does not change. When any one of the collimation element 20 and the diffraction element 30 is broken, the distance between the incidence surface and the emergence surface of the collimation element 20 or the diffraction element 30 changes. The electrical signals obtained by the processor 70 from the emitter and the receiver may reflect the change and indicate the distance between the incidence surface and the emergence surface of the collimation element 20 or the diffraction element 30 after the change. In some embodiments, when the change of the distance between the incidence surface and the emergence surface of each of the collimation element 20 and the diffraction element 30 is within the predetermined interval, that is, the change of the distance is small, the collimation element 20 and the diffraction element 30 can still operate normally. In this case, the processor 70 does not need to turn off the laser emitter 10 or reduce the transmission power of the laser emitter 10. When the distance between the incidence surface and the emergence surface of the at least one of the collimation element 20 and the diffraction element 30 changes much, that is, the distance change exceeds the predetermined interval, the processor 70 needs to perform an operation of turning off the laser emitter 10 or reducing the transmission power of the laser emitter 10, so as to avoid the problem that the user's eyes may be injured when the energy of the emergent laser is too large. In addition, when the emitter emits light, the wavelength of the light should be inconsistent with the wavelength of the laser emitted by the laser emitter 10, so as to avoid affecting formation of the laser pattern.

Figure 18:
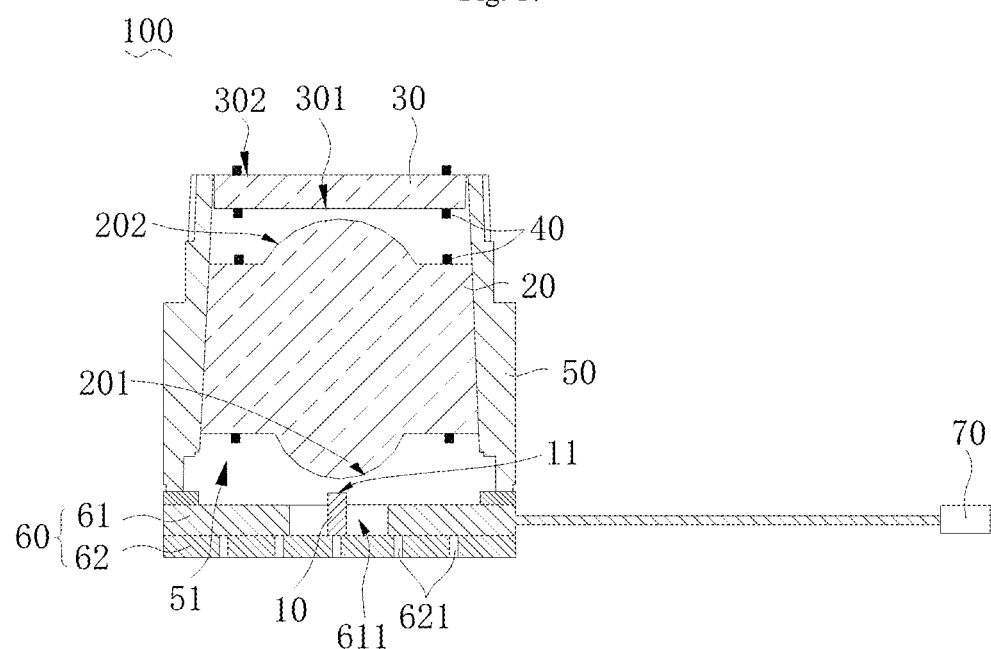
Figure 19:
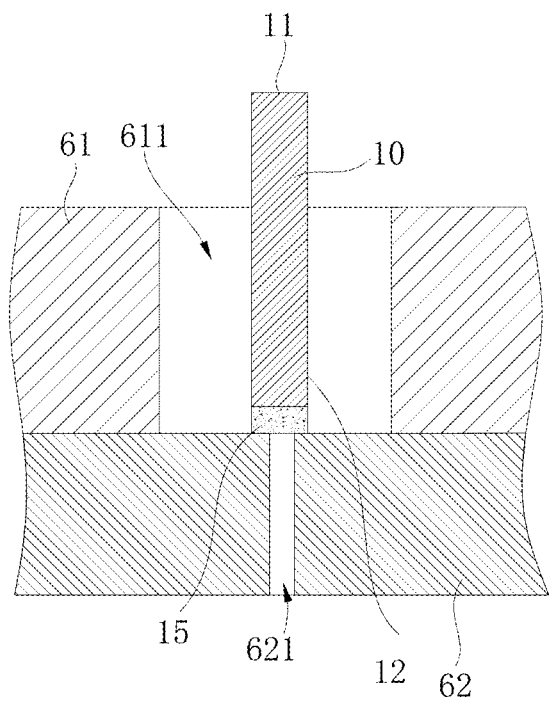
FIGS. 19-21 are partial schematic views illustrating a laser projection module according to some embodiments of the present disclosure.
Figure 20:
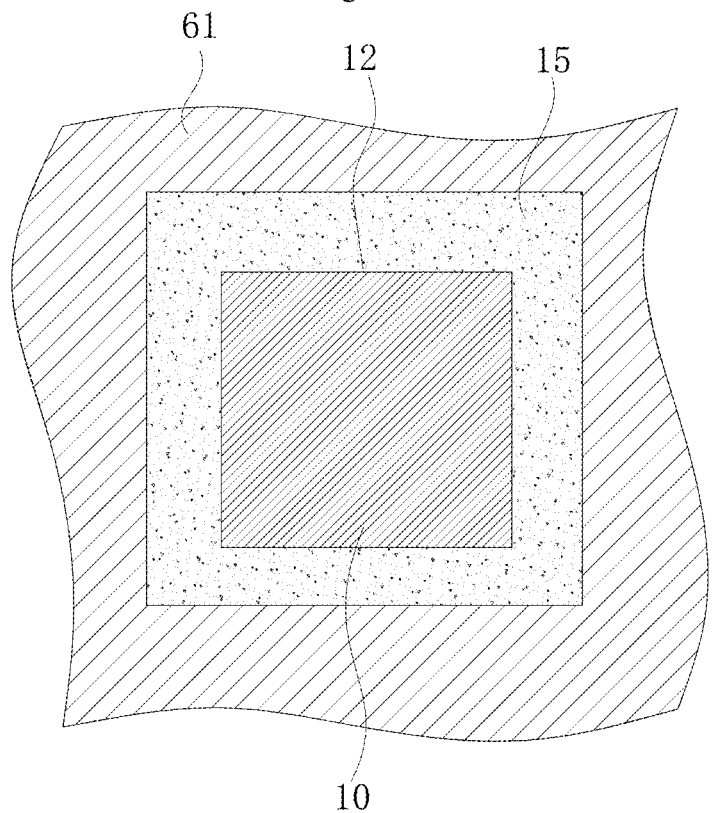

As illustrated in FIGS. 17 and 18, in some embodiments, the laser emitter 10 may be an edge-emitting laser. In some embodiments, the laser emitter 10 may be a distributed feedback laser (DFB). The laser emitter 10 is used for emitting laser into the accommodating chamber 51. The laser emitter 10 has a columnar shape as a whole, and the laser emitter 10 defines a light-emitting surface 11 on an end thereof away from the substrate 62. The laser is emitted from the light-emitting surface 11 and the light-emitting surface 11 faces the collimation element 20. The laser projection module 100 uses the edge-emitting laser as the laser emitter 10. On one hand, the edge-emitting laser has a lower temperature drift than the VCSEL array. On the other hand, since the edge-emitting laser has a single-point light-emitting structure, no array structure needs to be provided and the manufacturing is easy, such that the cost of the laser projection module 100 is low.

When the laser of the distributed feedback laser propagates, the power gain is obtained through feedbacks of the grating structure. In order to enhance the power of the distributed feedback laser, the injected current and/or the length of the distributed feedback laser need to be increased. Since increasing the injected current will increase the power consumption of the distributed feedback laser and cause a severe heat emission, in order to ensure that the distributed feedback laser can operate normally, it is required to increase the length of the distributed feedback laser, such that the distributed feedback laser generally has a slender structure. When the light-emitting surface 11 of the edge-emitting laser faces the collimation element 20, the edge-emitting laser is arranged vertically. Since the edge-emitting laser has the slender structure, the edge-emitting laser tends to encounter accidents such as dropping, shifting or shaking. A fixing member can be provided to fix the edge-emitting laser so as to prevent the edge-emitting laser from encountering accidents such as dropping, shifting or shaking.

As illustrated in FIGS. 17 to 20, in some embodiments, the fixing member may be a sealant 15. The laser emitter 10 may be adhered to the substrate 62 by the sealant 15. For example, a surface of the laser emitter 10 opposite to the light-emitting surface 11 is adhered to the substrate 62. A side surface 12 of the laser emitter 10 may also be adhered to the substrate 62. The sealant 15 wraps around the surrounding sides. Alternative, the sealant 15 may adhere only one side surface to the substrate 62, or adhere several side surfaces to the substrate 62. In this case, the sealant 15 may be a thermal conductive glue to conduct heat generated by the operation of the laser emitter 10 to the substrate 62.

Figure 21:
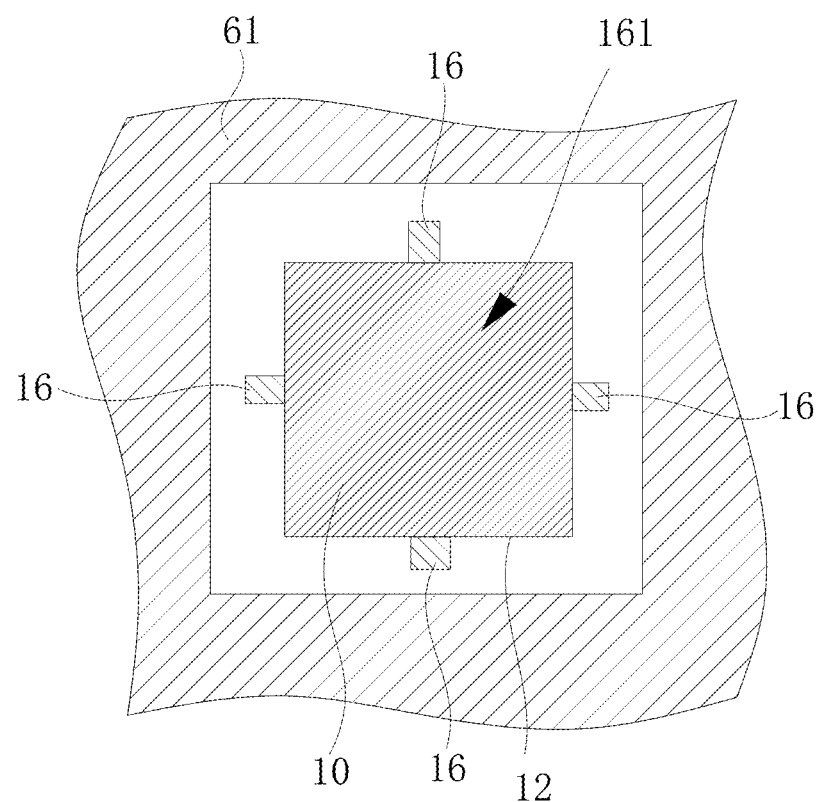

As illustrated in FIGS. 17, 18 and 21, in some embodiments, the laser transmitter 10 may also be fixed to the substrate 62 in a fixing manner as illustrated in FIG. 21. In some embodiments, the fixing member may also be an elastic support frame 16. Two or more support frames 16 may be provided. The support frames 16 define a receiving cavity 161 together. The receiving cavity 161 is used for receiving the laser emitter 10 therein, and the support frames 16 are used for supporting the laser emitter 10. In this way, it is possible to prevent the laser emitter 10 from being shaken.

In some embodiments, the substrate 62 may be omitted, and the laser emitter 10 may be directly fixed on the circuit board 61 to reduce the overall thickness of the laser projection module 10.

In some embodiments, the laser projection module 100 may further include a protection cover, and the protection cover is connected to the lens barrel 50. The protection cover includes a protection top wall, and the protection top wall is provided with a light transmission hole. The light transmission hole corresponds to the diffraction element 30.

In the laser projection module 100, the depth camera 1000 and the electronic device 3000 according to the embodiments of the present disclosure, the detection component 40 is arranged to the collimation element 20 and the diffraction element 30 of the laser projection module 100, and the distance between the collimation element 20 and the diffraction element 30 is detected by using the detection component 40, such that it is determined that at least one of the collimation element 20 and the diffraction element 30 are fallen off or inclined when the distance between the collimation element 20 and the diffraction element 30 changes and the change value exceeds the predetermined interval. In this case, the processor 70 may immediately turn off the laser emitter 10 or reduce the emission power of the laser emitter 10, thereby avoiding the problem that the user's eyes may be injured when the energy of the emergent laser is excessively large due to the fall-off of the at least one of the collimation element 20 and the diffraction element 30, and hence improving the safety of using the laser projection module 100.

In the laser projection module 100, the depth camera 1000 and the electronic device 3000 according to the embodiments of the present disclosure, the detection component 40 is arranged to at least one of the collimation element 20 and the diffraction element 30 of the laser projection module 100, and the electrical signal of the at least one of the collimation element 20 and the diffraction element 30 is detected by using the detection component 40, so as to detect whether the at least one of the collimation element 20 and the diffraction element 30 is broken. When any one of the collimation element 20 and the diffraction element 30 is broken, the processor 70 may immediately turn off the laser emitter 10 or reduce the emission power of the laser emitter 10, thereby avoiding the problem that the user's eyes may be injured when the energy of the emergent laser is excessively large due to the damage of the at least one of the collimation element 20 and the diffraction element 30, and hence improving the safety of using the laser projection module 100.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from the scope of the present disclosure.

What is claimed is:

1. A laser projection module, comprising:
   a laser emitter configured to emit laser;
   a collimation element configured to collimate the laser;
   a diffraction element configured to diffract the laser collimated by the collimation element to define a laser pattern;
   a detection component disposed to at least one of the collimation element and the diffraction element, and configured to output an electrical signal; and
   a processor coupled to the detection component, and configured to receive the electrical signal and detect whether the at least one of the collimation element and the diffraction element is abnormal based on the electrical signal;
   wherein a part of the detection component is disposed to the collimation element, another part of the detection component is disposed to the diffraction element, the detection component is configured to detect a distance between the collimation element and the diffraction element and to output the electrical signal, the processor is configured to judge whether the electrical signal is within a preset range, and determine that a change of the distance between the collimation element and the diffraction element exceeds a predetermined interval when the electrical signal is not within the preset range.

2. The laser projection module according to claim 1, wherein the laser projection module further comprises a substrate assembly and a lens barrel, the substrate assembly comprises a substrate and a circuit board arranged on the substrate, the lens barrel is arranged on the circuit board and defines an accommodating chamber together with the circuit board, the collimation element and the diffraction element are accommodated in the accommodating chamber, and arranged in sequence along a light-emitting path of the laser emitter.

3. The laser projection module according to claim 1, wherein the detection component comprises two detection electrodes, one of the two detection electrodes is arranged to the collimation element, and the other one of the two detection electrodes is arranged to the diffraction element, so as to provide a capacitor.

4. The laser projection module according to claim 2, wherein the detection component comprises an emitter and a receiver, the emitter is disposed to the collimation element, the receiver is disposed to the diffraction element, the emitter is arranged opposite to the receiver, the emitter is configured to emit a light or an ultrasonic wave, and the receiver is configured to receive the light or the ultrasonic wave emitted by the emitter.

5. The laser projection module according to claim 2, wherein the detection component comprises an emitter and a receiver, the emitter is disposed to the diffraction element, the receiver is disposed to the collimation element, the emitter is arranged opposite to the receiver, the emitter is configured to emit a light or an ultrasonic wave, and the receiver is configured to receive the light or the ultrasonic wave emitted by the emitter.

6. The laser projection module according to claim 1, wherein the laser projection module further comprises a substrate assembly and a lens barrel, the substrate assembly comprises a substrate and a circuit board arranged on the substrate, the lens barrel is arranged on the circuit board and defines an accommodating chamber together with the circuit board, the collimation element and the diffraction element are accommodated in the accommodating chamber, and arranged in sequence along a light-emitting path of the laser emitter, a side wall of the lens barrel is provided with a bearing stage extending towards a center of the accommodating chamber, the bearing stage is arranged between the collimation element and the diffraction element, and the diffraction element is mounted to the bearing stage.

7. The laser projection module according to claim 6, wherein the bearing stage is provided with a through hole and the detection component comprises two detection electrodes, the two detection electrodes are received in the though hole, one of the two detection electrodes is disposed to the collimation element, and the other one of the two detection electrodes is disposed to the diffraction element, so as to provide a capacitor.

8. The laser projection module according to claim 1, wherein the laser emitter comprises an edge-emitting laser, the edge-emitting laser comprises a light emitting surface, and the light emitting surface faces the collimation element.

9. The laser projection module according to claim 8, wherein the laser projection module further comprises a fixing member and a substrate assembly, and the fixing member is configured to fix the edge-emitting laser to the substrate assembly.

10. The laser projection module according to claim 9, wherein the fixing member comprises a sealant disposed between the edge-emitting laser and the substrate assembly, and the sealant is a thermal conductive glue.

11. The laser projection module according to claim 9, wherein the fixing member comprises at least two elastic support frames arranged on the substrate assembly, the at least two support frames define a receiving cavity together, the receiving cavity is configured to receive the laser emitter therein, and the at least two support frames are configured to support the laser emitter.

12. A depth camera, comprising:
- a laser projection module, the laser projection module comprising:
  - a laser emitter configured to emit laser;
  - a collimation element configured to collimate the laser;
  - a diffraction element configured to diffract the laser collimated by the collimation element to define a laser pattern;
  - a detection component disposed to at least one of the collimation element and the diffraction element, and configured to output an electrical signal; and
  - a processor coupled to the detection component, and configured to receive the electrical signal and detect whether the at least one of the collimation element and the diffraction element is abnormal based on the electrical signal; and
- an image acquirer configured to acquire the laser pattern projected by the laser projection module into a target space, the processor being further configured to process the laser pattern to obtain a depth image;
- wherein the processor is further configured to judge an operation state of the laser projection module according to the electrical signal of the detection component, so as to control the laser emitter of the laser projection module to be turned on or off.

13. An electronic device, comprising:
- a housing; and
- a depth camera arranged in the housing and exposed out of the housing to acquire the depth image, the depth camera comprising:
  - a laser emitter configured to emit laser;
  - a collimation element configured to collimate the laser;
  - a diffraction element configured to diffract the laser collimated by the collimation element to define a laser pattern;
  - an image acquirer configured to acquire the laser pattern projected by the laser projection module into a target space;
  - a detection component disposed to at least one of the collimation element and the diffraction element, and configured to output an electrical signal; and
  - a processor coupled to the detection component, and configured to receive the electrical signal and detect whether the at least one of the collimation element and the diffraction element is abnormal based on the electrical signal, the processor being further configured to process the laser pattern to obtain a depth image;
- wherein the collimation element comprises a collimation incidence surface and a collimation emergence surface on two opposite sides thereof, the diffraction element comprises a diffraction incidence surface and a diffraction emergence surface on two opposite sides thereof, the detection component comprises a pair of detection electrodes respectively disposed to the incidence surface and the emergence surface of at least one of the collimation element and the diffraction element, the pair of detection electrodes are configured to output the electrical signal after being energized, and the processor is configured to detect whether the at least one of the collimation element and the diffraction element is broken according to a change of the electrical signal.

14. The electronic device according to claim 13, wherein the pair of detection electrodes provide a capacitor, and the processor is configured to judge whether the at least one of the collimation element and the diffraction element is broken according to a change of a capacitance of the capacitor.

15. The electronic device according to claim 13, wherein the laser projection module further comprises:
- a substrate assembly, the substrate assembly comprising a substrate and a circuit board carried on the substrate, the circuit board being provided with a via hole, and the laser emitter being carried on the substrate and received in the via hole; and
- a lens barrel, the lens barrel comprising a side wall arranged on the substrate assembly and defining an accommodating chamber together with the substrate assembly, the laser emitter, the collimation element and the diffraction element being received in the accommodating chamber and arranged in sequence along a light-emitting path of the laser emitter.

16. The electronic device according to claim 15, wherein the lens barrel further comprises a bearing stage extending from the side wall of the lens barrel towards a center of the accommodating chamber, the bearing stage is arranged between the collimation element and the diffraction element, and the diffraction element is mounted to the bearing stage.

17. The electronic device according to claim 16, wherein the bearing stage is provided with a through hole, and the detection electrode of the detection component arranged to at least one of the collimation emergence surface and the diffraction incidence surface is received in the through hole.

* * * * *